Jan. 23, 1940.     J. A. WANEK     2,188,196
TRACTION LUG
Filed March 29, 1938
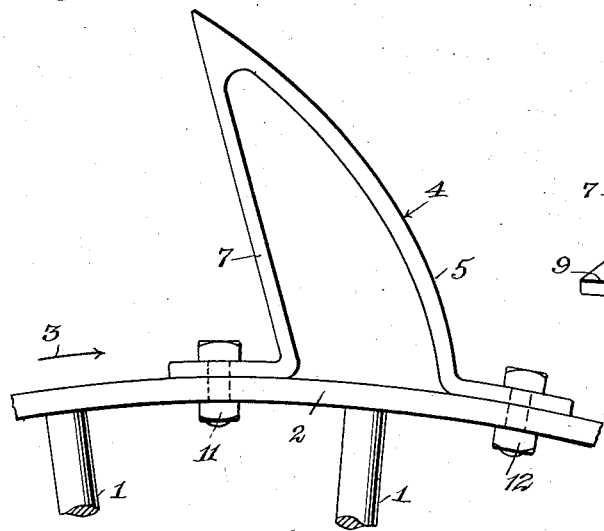
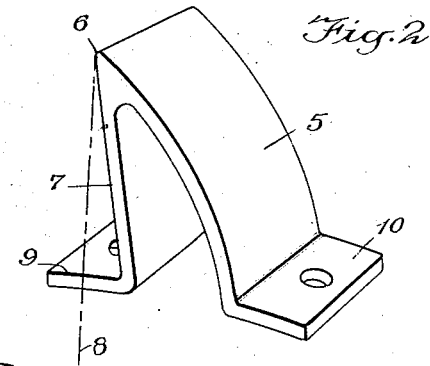
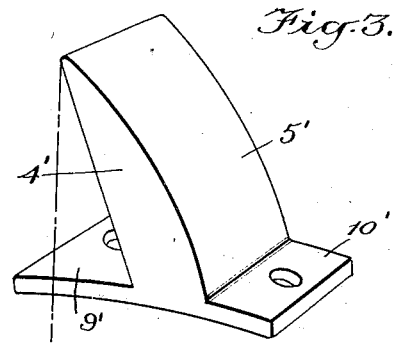
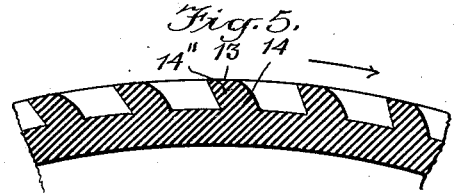
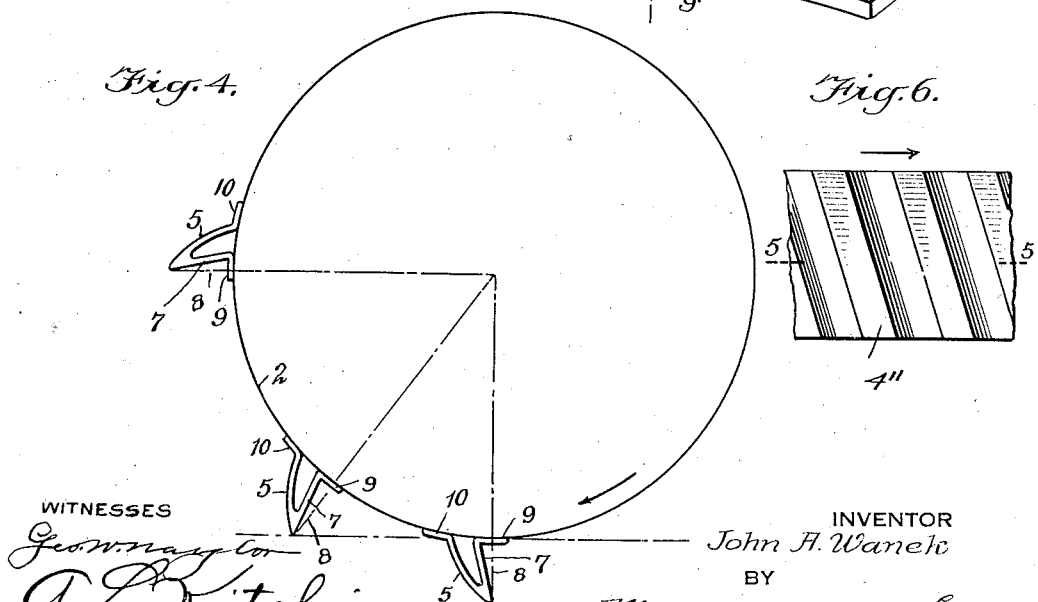
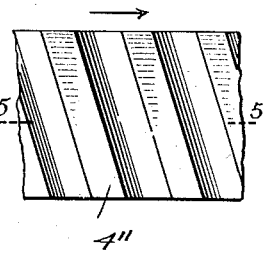
INVENTOR
John A. Wanek
BY
Munn Anderson & Liddy
ATTORNEYS Patented Jan. 23, 1940

2,188,196

UNITED STATES PATENT OFFICE 2,188,196

TRACTION LUG

John A. Wanek, Giltner, Nebr.

Application March 29, 1938, Serial No. 198,635

1 Claim. (Cl. 301—44)

This invention relates to an anti-slipping structure for tires or tire treads, and has for an object to provide an improved construction which may be separate from or integral with the tire or rim of a wheel.

Another object of the invention is to provide a lug adapted to be applied to the rim or peripheral part of a wheel for reducing the slippage of a wheel particularly if the wheel is driven by power.

A further object of the invention is to provide a lug or similar structure for either metal rims of wheels or rubber tires wherein lugs of a desired shape are provided and arranged so that by reason of the shape of the lugs the least possible displacement of the ground is made attendant to a maximum gripping efficiency.

In the accompanying drawing—

Fig. 1 is a fragmentary side view of a rim and wheel with a lug embodying the invention applied thereto;

Fig. 2 is a perspective view of the lug shown in Fig. 1, the same being on a slightly reduced scale;

Fig. 3 is a perspective view similar to Fig. 2 but showing a slightly modified form of lug;

Fig. 4 is a view shown particularly as a diagram and illustrating how one or more lugs may be applied to a wheel;

Fig. 5 is a fragmentary sectional view through Fig. 6 approximately on the line 5—5;

Fig. 6 is a fragmentary top plan view of a rubber tire.

Referring to the accompanying drawing by numerals, 1 indicates a wheel of any desired kind provided with a metal rim 2. The wheel 1 is adapted to rotate in the direction indicated by the arrow 3, and as the rim 2 is comparatively smooth the traction is small. Where wheels of this type are used on tractors or other vehicles and where the wheels are driven by power, some traction is desired other than the smooth surface of the rim presents. Various means have heretofore been provided for securing this additional traction, but in providing cleats and other devices for this purpose the ground or surface over which the wheel passes is dug up or mutilated more or less without producing fully the traction desired.

In the present invention improved lugs are provided which are adapted to secure the desired traction with a minimum displacement of the ground. As shown in Figs. 1 and 2, the lug 4 is provided with a front arc-shaped surface 5 merging into a point 6 and provided with a rear wall 7 that extends at an angle to the radial line 8. The wall 7 preferably merges into a flange 9, while wall 5 merges into a flange 10. The flanges just mentioned are each provided with one or more apertures so as to receive the respective bolts 11 and 12, whereby the lug may be bolted to the rim 2. The lug 4 is preferably of the same width as the rim 2, though if desired it could be somewhat wider or somewhat narrower. By reason of the rounded forward surface 5, the lug in a certain sense rolls or slips on the ground and enters the same, as well as leaves the ground without unnecessarily distorting the general surface of the ground. It will, therefore, be seen that the shape of the front 5 of the lug is so designed that substantially equal pressure is applied vertically as the wheel rotates with a minimum digging displacement and with the greatest possible evenness of wear of the lug and straight downward thrust on the ground. It will be understood that the front or forward face 5 engages the earth first as the wheel rotates.

It will be seen, particularly from Figs. 1 and 4, that the rear wall 7 of the lug is offset from line 8 which is coincident with an extension of the radius of the wheel 1 by an amount sufficient to prevent the lever action which would cause an undue rotation of the wheel to which the lug is attached. It has been found that the angle between line 8 and wall 7 is appreciably 15°, though this angle could be varied appreciably without departing from the spirit of the invention. The shape of the front 5 of the lug is important in the action just described, while the back wall 7 acts as a support and a strengthening member for the front of the lug.

In Fig. 3 a slightly modified construction is shown in which the same inventive concept is present. In this form of the invention the parts are solid throughout with the suface 5' curved in the same manner as surface 5 and with forward and rearward lugs 9' and 10'. Preferably in this form of the invention the flange 9' is larger than the flange 9 so as to give ample support to the body 4' of the lug.

It will be noted that since the principal motion of the wheel 1 is forward, it is to this that the design and construction of the parts pertains and, therefore, the efficiency will be impaired when a reverse motion to the wheel is applied. In forming the lug 4 as shown in Fig. 1 and also in forming the lug as shown in Fig. 3, any desired metal may be provided but preferably these members are made from steel and bolted or otherwise rigidly secured to the rim 2 or the peripheral part of the wheel.

While the lugs have been primarily designed to be used in connection with metal rims, as for instance rim 2, which are comparatively smooth, the inventive concept could be applied to rubber tires which are applied to flat rims similar to rim 2. In carrying out this form of the invention the structure may be made as shown in Figs. 5 and 6. It will be seen from these figures that the respective lugs 4'' are substantially the same shape as shown in Fig. 1 except that the outer surface 13 is flat and the lug at the base is preferably thicker than the lugs shown in Fig. 3, though it is solid throughout instead of hollow as shown in Figs. 1 and 2. Also preferably the various lugs 4'' extend at an angle across the tire, as illustrated in Fig. 6, though they could be made to extend in some other direction without departing from the spirit of the invention.

In all forms of the invention it will be noted that the arc-shaped surface 5 is utilized and instead of a quick entrance of the point 6 into the ground as would be the case if the wheel were reversed, the lug is gradually and through the weight of the machine forced into the ground and thereby gives the desired traction without digging up the ground to an appreciable extent. This action is easy on the machine to which the lug is applied as well as upon the lug and the surface over which the wheel moves. It will be understood that one or any desired number of lugs could be used on the traction wheel. Preferably the lugs are arranged rather close together though not in contact. It will, of course, be understood that the lugs must be sufficiently far enough apart to permit the complete functioning of one lug before the next lug begins to act.

I claim:

A device of the character described comprising a wheel having a rim and a plurality of spaced lugs secured to the outer surface of said rim and extending generally radially therefrom, each lug consisting of a body with flanges through which securement to the rim is had, said body being straight transversely of the wheel and having a forward face originating at one of the flanges and struck on a continuous, convex curvature, said body also having a straight rear face originating from the other flange and merging with said forward face to provide a sharp tip, said rear face being stationed at an acute angle to a radial plane extended to said tip and being pitched in the direction of said forward face so that the base portion of said rear face falls within the confines of said forward face and said radial plane.

JOHN A. WANEK.